United States Patent [19]

Kuo

[11] Patent Number: 5,742,270
[45] Date of Patent: Apr. 21, 1998

[54] OVER LINE SCAN METHOD

[75] Inventor: Fang-Chien Kuo, Hsinchu, Taiwan

[73] Assignee: Industrial Technology Research Institute, Hsinchu, Taiwan

[21] Appl. No.: 612,619

[22] Filed: Mar. 6, 1996

[51] Int. Cl.⁶ .................................................. H04N 7/00
[52] U.S. Cl. ............................................ 345/100; 348/447
[58] Field of Search ................................ 345/90, 91, 92, 345/87, 100, 93; 348/447, 458; 315/169.4

[56] References Cited

U.S. PATENT DOCUMENTS

| | | | |
|---|---|---|---|
| 4,701,793 | 10/1987 | den Hollander et al. | 348/447 |
| 5,331,252 | 7/1994 | Kim | 315/169.4 |
| 5,332,949 | 7/1994 | Kim | 315/169.4 |
| 5,365,284 | 11/1994 | Matsumoto et al. | 345/99 |
| 5,461,424 | 10/1995 | Shimizu | 345/100 |
| 5,488,389 | 1/1996 | Nakanishi et al. | 345/131 |
| 5,489,919 | 2/1996 | Kuwata et al. | 345/100 |
| 5,568,163 | 10/1996 | Okumura | 345/92 |

OTHER PUBLICATIONS

"A 76-mm (3-in) Driver Integrated Poly-Si TFT-LCD Light Valve" by F. Okumura et al, SID '94 Digest, paper 8.2. pp. 79-82.

Primary Examiner—Mark R. Powell
Attorney, Agent, or Firm—George O. Saile; Stephen B. Ackerman; Larry J. Prescott

[57] ABSTRACT

This invention provides a method for scanning a thin film transistor liquid crystal display which eliminates the undesirable brightness fluctuations in the display due to parasitic capacitance. When conventional scanning methods are used in thin film transistor liquid crystal displays parasitic and other capacitances in the array cause fluctuations in brightness of the pixels. This method scans multiple rows of the display simultaneously and still eliminates the brightness fluctuations of the pixels.

26 Claims, 10 Drawing Sheets

OVER LINE SCAN METHOD

RELATED PATENT APPLICATION (1) (E83-0066), Ser. No. 08/557,653, filed Nov. 13, 1995, entitled "NON-OVERLAPPED SCANNING FOR A LIQUID CRYSTAL DISPLAY," by the same inventor.

BACKGROUND OF THE INVENTION

(1) Field of the Invention

This invention relates to a thin film transistor liquid crystal display for a high density television system. Parasitic and other capacitance in the thin film transistor liquid crystal display causes brightness fluctuations in the display when scanned by conventional methods. This invention provides a method of scanning the display so that the fluctuations in brightness are eliminated.

(2) Description of Related Art

When thin film transistor liquid crystal displays are scanned using the conventional line pair scanning means of scanning two rows at a time and scanning the display twice during each frame of the display image the pixels demonstrate an undesirable brightness fluctuation. This brightness fluctuation is caused by parasitic capacitance in the thin film transistor liquid crystal display. A paper "A 76-mm (3-in.) DRIVER INTEGRATED POLY-SI TFT-LCD LIGHT VALVE," by F. Okumura et al, SID 94 Digest, paper 8.2, pages 79–82 discusses the problem of brightness fluctuations and suggests a method of driving the array which greatly reduces the brightness fluctuations. U.S. Pat. No. 5,331,252 to Kim and U.S. Pat. No. 5,332,949 to Kim discuss structure and driving methods of display panels.

SUMMARY OF THE INVENTION

FIGS. 1 and 2 show diagrams of a conventional thin film transistor liquid crystal display showing the N row by M column array of cells making up the display, where N and M are positive integers. FIG. 1 shows a diagram for the case where the odd numbered rows of the array are driven by one gate scan driver 33 and the even numbered rows of the array are driven by another gate scan driver 34. FIG. 2 shows a diagram for the case where all rows of the array are driven by the same gate scan driver 35.

FIG. 3A shows an equivalent circuit diagram of one of the cell of row n of the array. As shown in FIG. 3A, each cell has a thin film transistor 22 switching element connected to a pixel represented by a capacitor $C_n$ 28. There is a storage capacitor $C_{sn}$ 24 and a gate source parasitic capacitance $C_{gn}$ 26 in each cell. The column select line capacitance $C_d$ 42. The row electrode 20 is connected to a row select line 30 for row n which also connects the row electrodes for the remaining cells in row n. As shown in FIG. 3A, the row electrode is the gate of the thin film transistor. The column electrode is connected to a column select line 70 which also connects the column electrodes for the remaining cells in the column. The voltage level on row select line n, where n is a positive integer from 1 to N, is VG(n) and is set by the gate scan driver. The voltage level on column data line m, where m is a positive integer from 1 to M, is VD(m) and is set by the data driver and contains the video information for the pixel. When the row select line voltage, VG(n), is $V_{GH}$ the row is selected and when the row select line voltage is $V_{GL}$ the row is not selected.

In the conventional line pair scanning method for selecting the rows of cells in the display a voltage pulse of voltage level $V_{GH}$ is applied to the row select lines two rows at a time and voltage level $V_{GL}$ is applied to the remaining row select lines. Each row select line is selected once in one scanning cycle. This conventional line pair scanning method of scanning results in brightness differences between pixels caused by parasitic capacitance between the gate of the thin film transistor of a cell and the pixel of the cell in the same column and next row. And, in both the progressive scanning mode (e.g. VGA system) and the interlaced mode, the sweep period becomes short when the number of scanning lines increase. The duty ratio is too low and the time to charge the TTF is not enough.

FIG. 3B shows an equivalent circuit diagram of two cells in consecutive rows of the same column of the display. The voltages applied to the row select lines of the cells are VG(n) and VG(n+1). The voltages at the pixels of the cells are VP(n) and VP(n+1). The conventional line pair scanning method of selecting two adjacent rows is shown in FIG. 4A with two identical selecting pulses being applied to the two adjacent rows. When the rows are selected in this manner there is considerable variation in the voltages at the pixels of the cells VP(n) and VP(n+1) when the voltages at the row select lines VG(n) and VG(n+1) drop from $V_{GH}$ 60, 61 to $V_{GL}$ 62, 63 due to the capacitances in each cell. This variation in voltage at the pixels causes an undesirable intensity variation or flicker in the display image.

Refer now to FIG. 4B, this variation in voltage at the pixels can be largely eliminated if the voltage at the row select line n, VG(n), drops from $V_{GH}$ 60 to $V_{GL}$ 62 a sufficient time interval 54 before the voltage at the row select line n+1, VG(n+1), drops from $V_{GH}$ 61 to $V_{GL}$ 63. For the thin film transistor liquid crystal displays in the VGA system the time interval must be about 2.47 microseconds or greater. The elimination of the variation at the pixels eliminates the undesirable flicker in the display image.

It is a principle object the invention to provide a means of driving multiple adjacent rows of a thin film transistor liquid crystal display simultaneously so that the brightness difference in pixels caused by cell capacitance is eliminated.

It is a further object of this invention to provide a thin film transistor liquid crystal display wherein multiple adjacent rows are selected simultaneously so as to increase the duty ratio and the charge time of thin film transistors.

These objects are achieved by selecting a plurality of row selection lines more than the scanning line/lines during each sweep period returning the voltage level of the selected row select line to $V_{GL}$ during the last block period of each sweep period. Each sweep period consists of an integral number of block periods. During each sweep period a row is selected or non selected. If the row is selected the voltage applied to the row select line is $V_{GH}$ during the entire sweep period except for the last block period of the sweep. During the last block period of the sweep period the voltage applied to the row select line is $V_{GL}$. If the row is non selected the voltage applied to the row select line is $V_{GL}$ during the entire sweep period. Since the number of the row selection lines is more than that of the scanning lines during each sweep period, some row selection lines are scanned twice. This inventive over line scan method is adaptable to column inversion systems.

DESCRIPTION OF THE PREFERRED EMBODIMENTS

Figure 1:
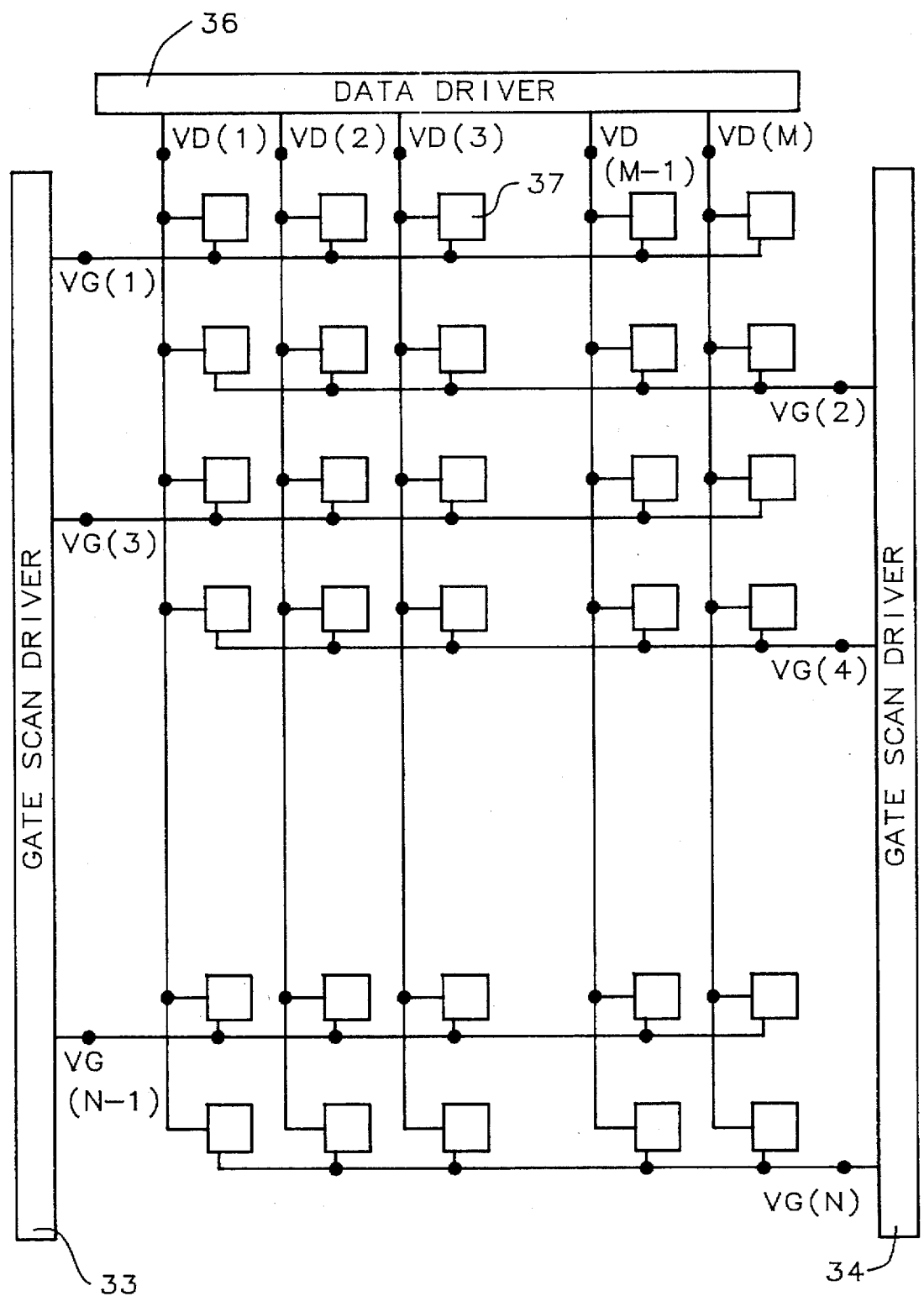
FIG. 1 is a diagram of a conventional thin film transistor liquid crystal display using two gate scan drivers.
Figure 2:
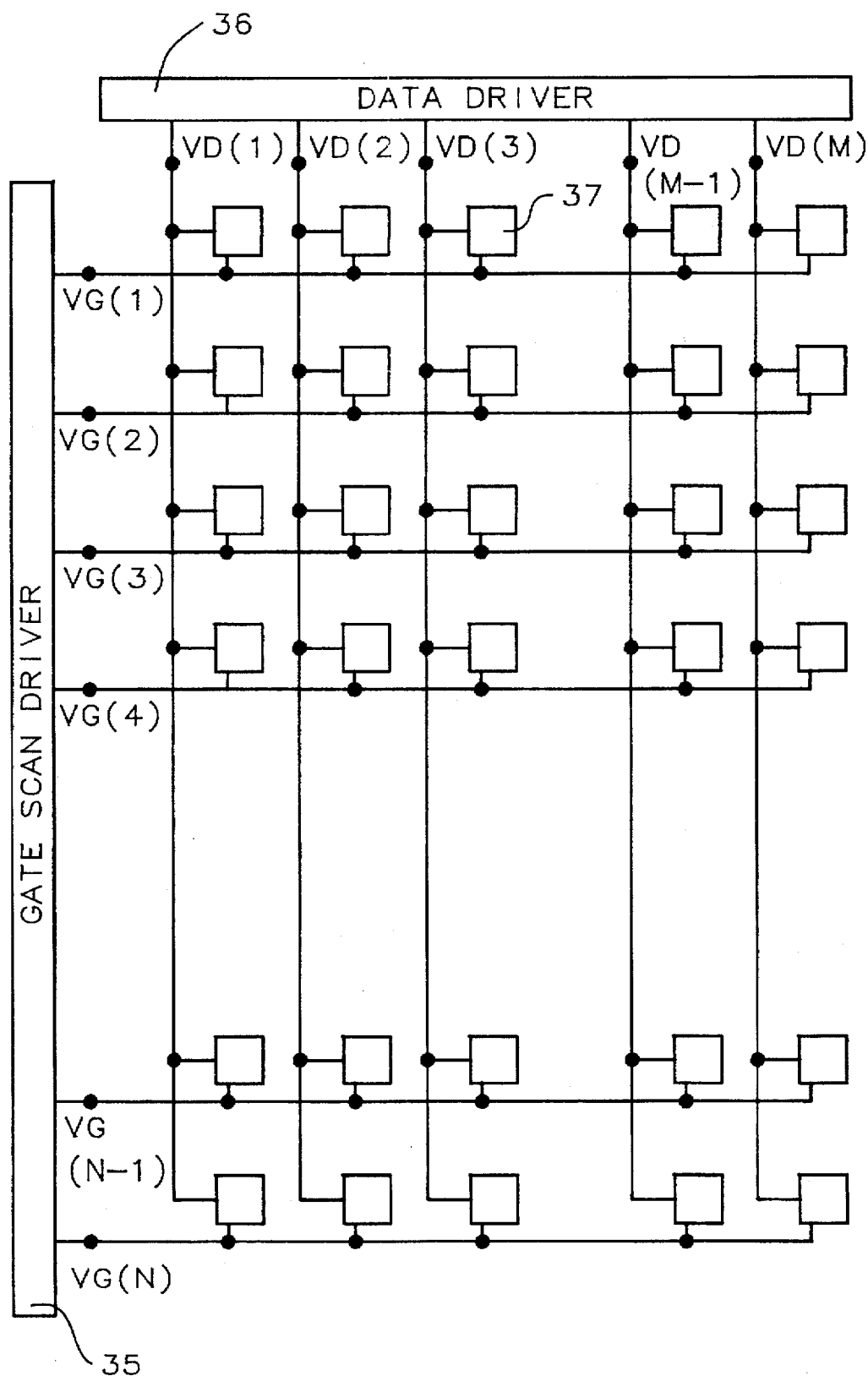
FIG. 2 is a diagram of a conventional thin film transistor liquid crystal display using a single gate scan driver.
Figure 3A:
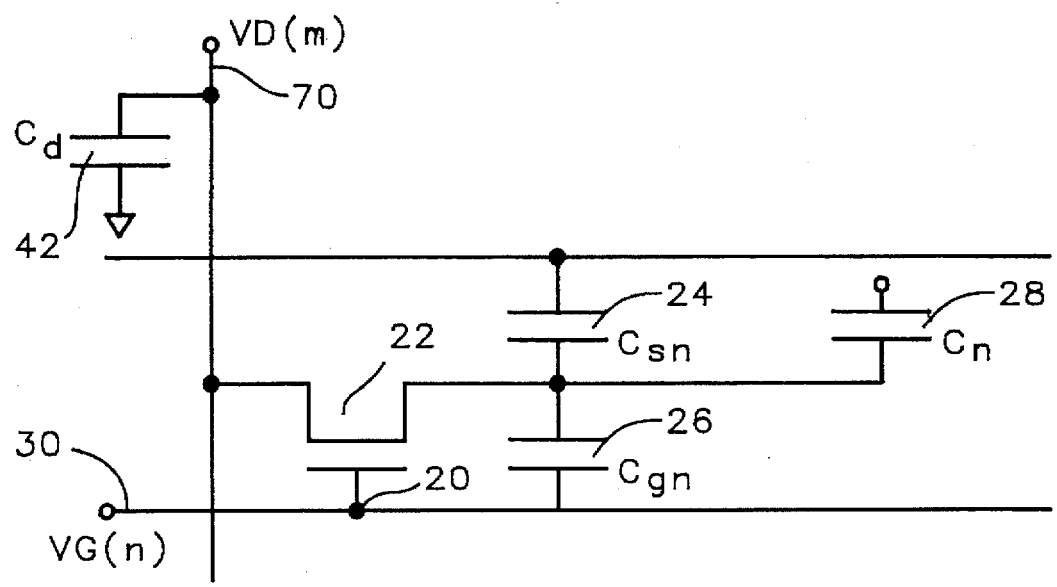
FIG. 3A is an equivalent circuit diagram of one of the cells of a conventional thin film transistor liquid crystal display.
Figure 3B:
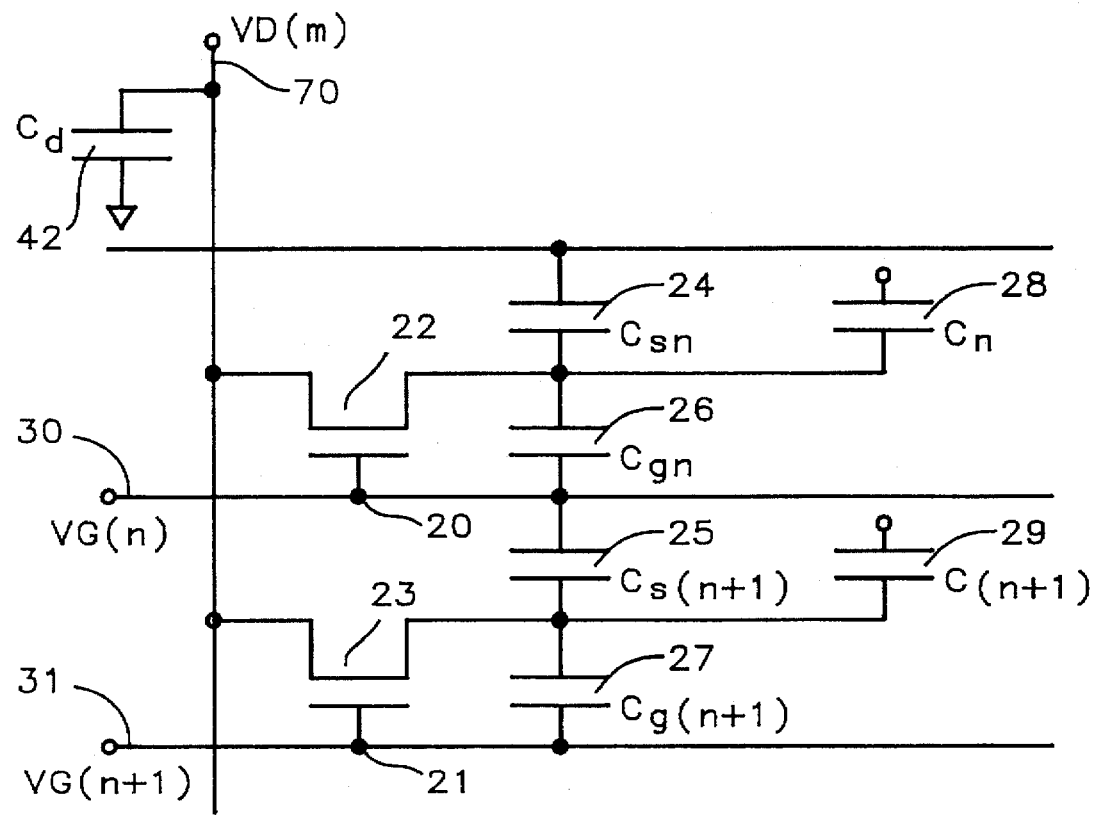
FIG. 3B is an equivalent circuit diagram of cells in two adjacent rows of a conventional thin film transistor liquid crystal display.
Figure 4A:
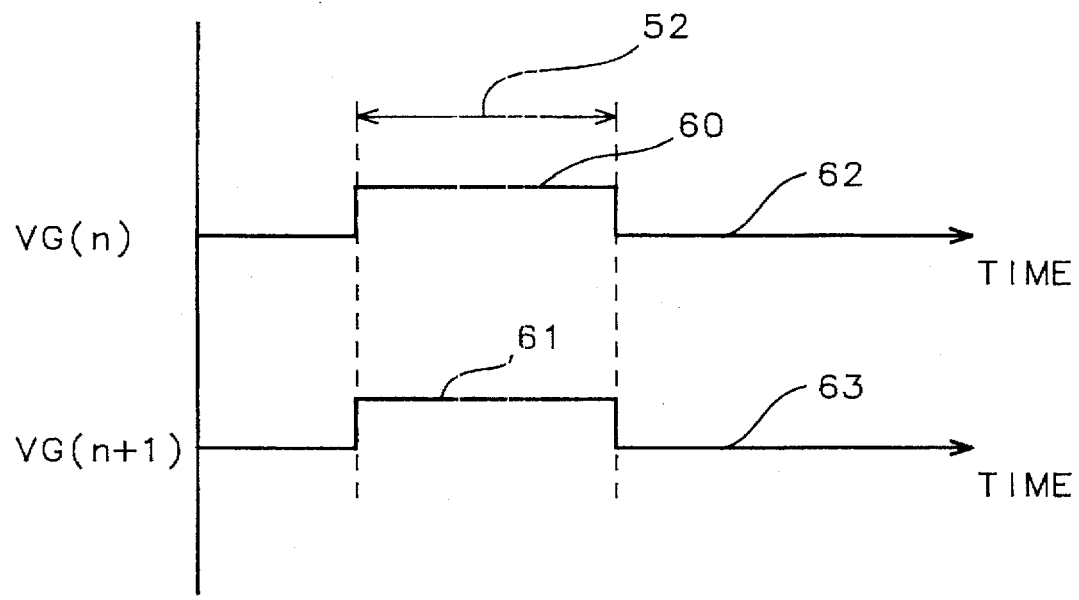
FIG. 4A shows the conventional selecting voltage pulses for two adjacent rows of a thin film transistor liquid crystal display.
Figure 4B:
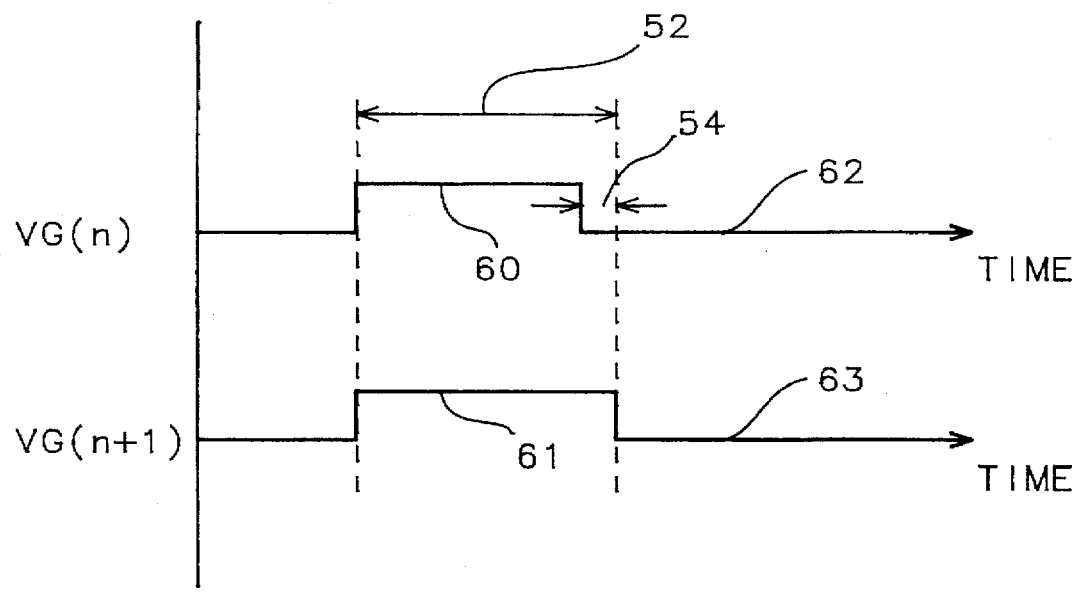
FIG. 4B shows the selecting voltage pulses for two adjacent rows of a thin film transistor liquid crystal display which compensate for the effect of cell capacitance on image flickering.

Refer now to FIG. 1, FIG. 2, and FIG. 3A, there are shown diagrams for driving the thin film transistor liquid crystal display. FIG. 1 and FIG. 2 show diagrams of the N row by M column array of cells 37 making up the array, where N is a positive integer such as 480 and M is a positive integer such as 640. FIG. 1 shows a diagram for the case where the odd numbered rows of the array are driven by one gate scan driver 33 and the even numbered rows of the array are driven by another gate scan driver 34. FIG. 2 shows a diagram for the case where all rows of the array are driven by the same gate scan driver 35. FIG. 3A shows an equivalent circuit diagram of one of the cells making up the display. As shown in FIG. 3A each cell has a thin film transistor 22 switching element connected to a pixel represented by a capacitor $C_n$ 28. The gate of the thin film transistor is connected to a row select line 30 which is connected to a gate scan driver which selects the row. The drain of the thin film transistor is connected to the column select line 70 which is connected to the data driver which supplies video information to the display.

As shown in FIG. 5A through FIG. 6B, the row select line voltage is varied between $V_{GH}$ 60 when the row is selected and $V_{GL}$ 62 when the row is not selected. $V_{GH}$ is between about 3 and 16 volts and $V_{GL}$ is between about −10 and −6 volts. A set of rows is selected during each sweep period 52 of about 31.78 microseconds in the VGS system and about 63.5 microseconds in the NTSC system. Each sweep period is made up of a block width 54 and a pulse width 53 wherein each block width is 4.5 microseconds or greater in the NTSC system. In each sweep period each row select line is either selected or not selected. If the line is not selected during a sweep period 52 the row select line voltage is in the non select mode and is $V_{GL}$ during the entire sweep period 52. In order to eliminate intensity fluctuations, if the line is selected during a sweep period the row select line voltage in the select mode and is $V_{GH}$ 60 for the entire sweep period except the block width 54 of the sweep period 52 and $V_{GL}$ 62 during the block width 54 of the sweep period 52.

Figure 5A:
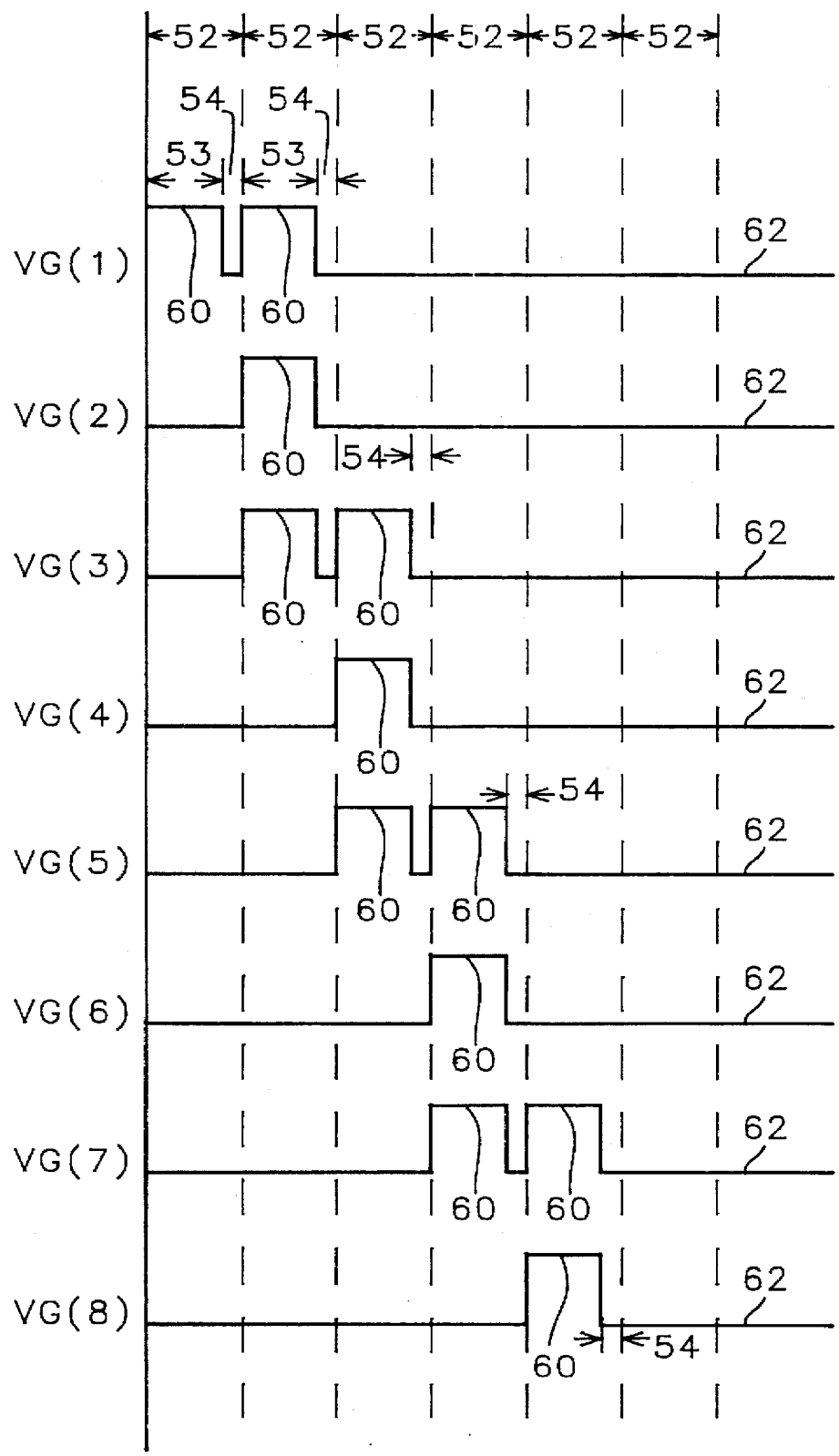
FIGS. 5A and 5B show the row select line pulse trains for one of the embodiments of this invention under interlaced mode.
Figure 5B:
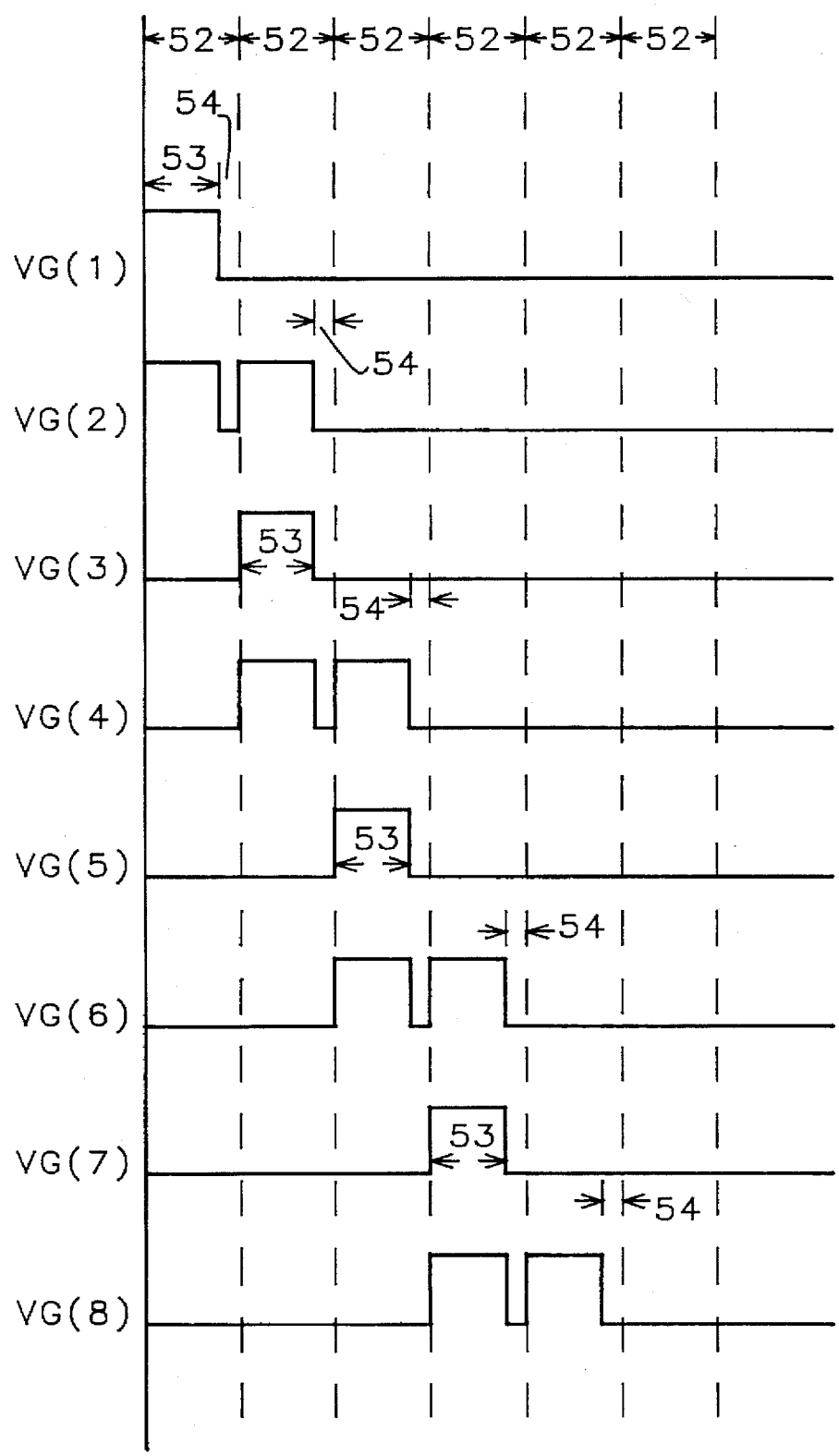
Figure 6A:
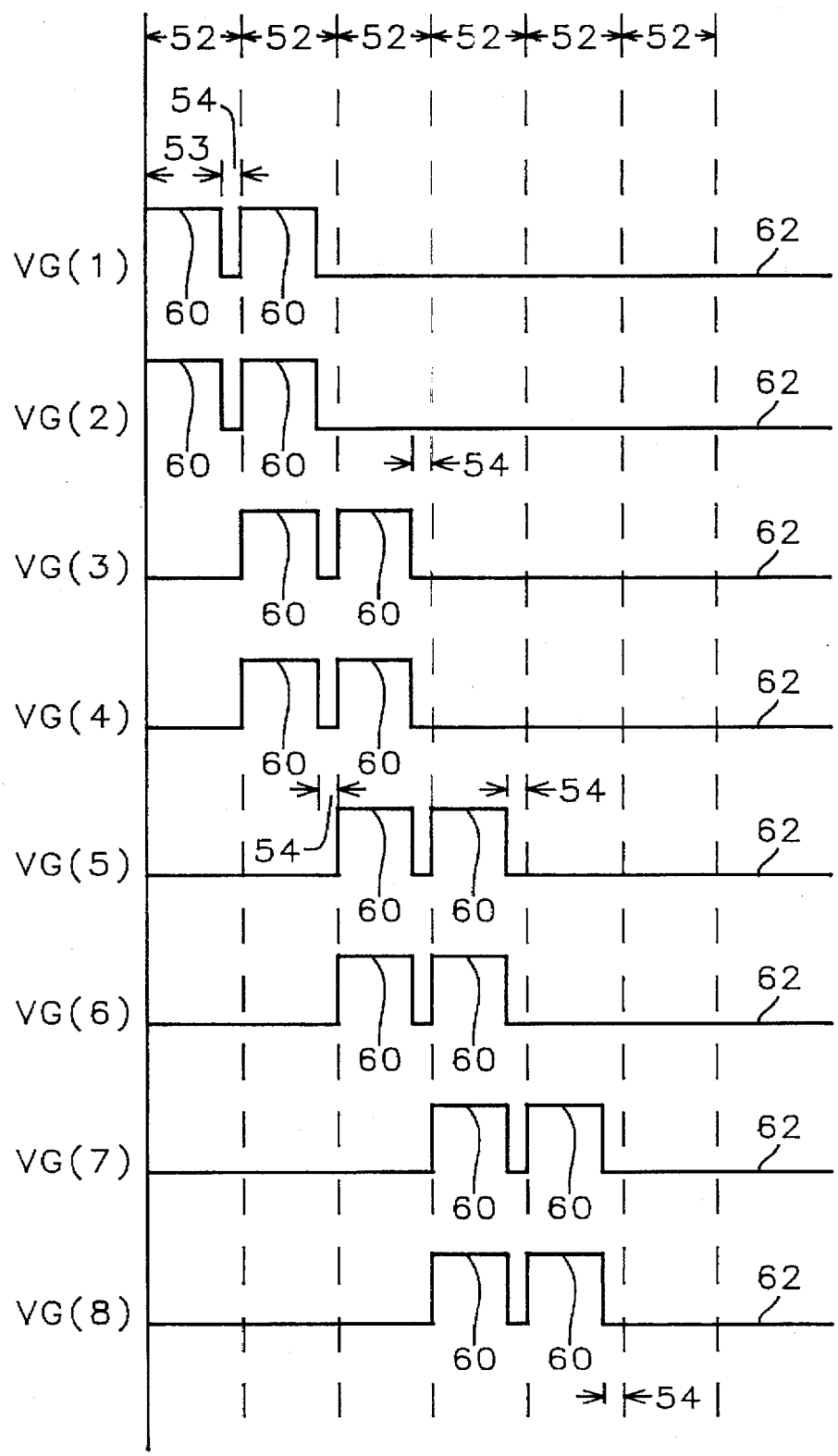
FIGS. 6A and 6B show the row select line pulse trains for another embodiment of this invention under interlaced mode.
Figure 6B:
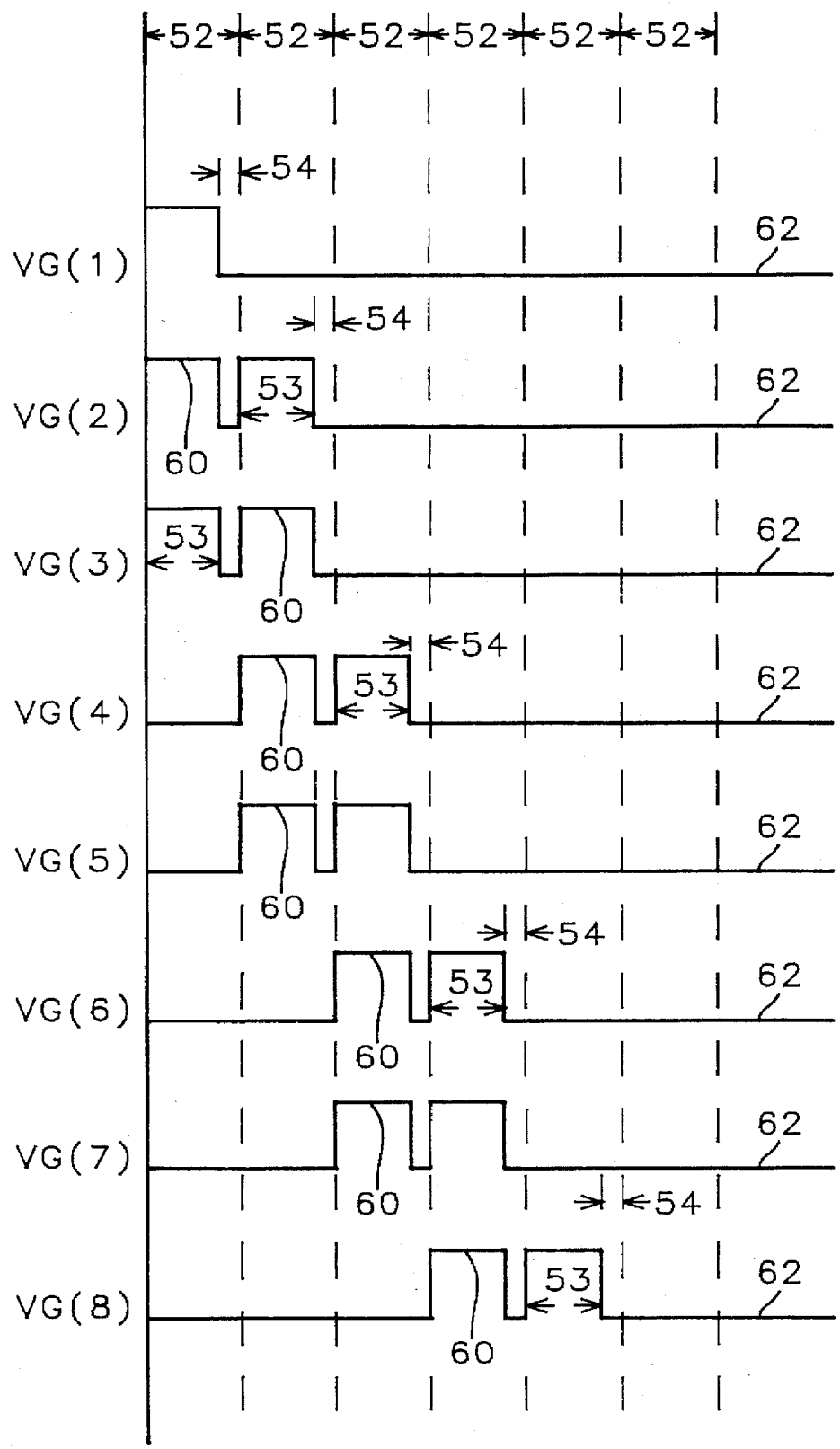

Refer now to FIG. 5A and FIG. 5B, there is shown an embodiment of a method for driving the thin film transistor liquid crystal display under line pair scanning. In this embodiment, three row select lines are selected at a time. FIG. 5A and FIG. 5B show the row select line pulse trains for the first and second fields respectively. As shown in FIG. 5A, in the first field the select mode voltage is applied sequentially to row select lines 1; 1, 2, and 3; 3, 4, and 5; 5, 6, and 7; 7, 8, and 9; . . . ; and 478, 479, and 480. As shown in FIG. 5B, the select mode voltage is offset one row selection line. Refer then to FIG. 6A and FIG. 6B, in another embodiment of this invention under line pair scanning mode, four row select lines are selected at a time. FIG. 6A and FIG. 6B show the row select line pulse trains for the first and second fields respectively. As shown in FIG. 6A, in the first field the select mode voltage is applied sequentially to row select lines 1 and 2; 1, 2, 3, and 4; 3, 4, 5, and 6; 5, 6, 7, and 8; 7, 8, 9, and 10; . . . ; and 477, 478, 479, and 480. And, as shown in FIG. 6B, the select mode voltage is offset 1 row selection line. In both the first and second fields when the select lines are not at the select mode voltage they are at the non select mode voltage. The embodiment of selecting 4 lines at a time is especially useful in a TFT LCD using two gate scan drivers as shown in FIG. 1.

Figure 7A:
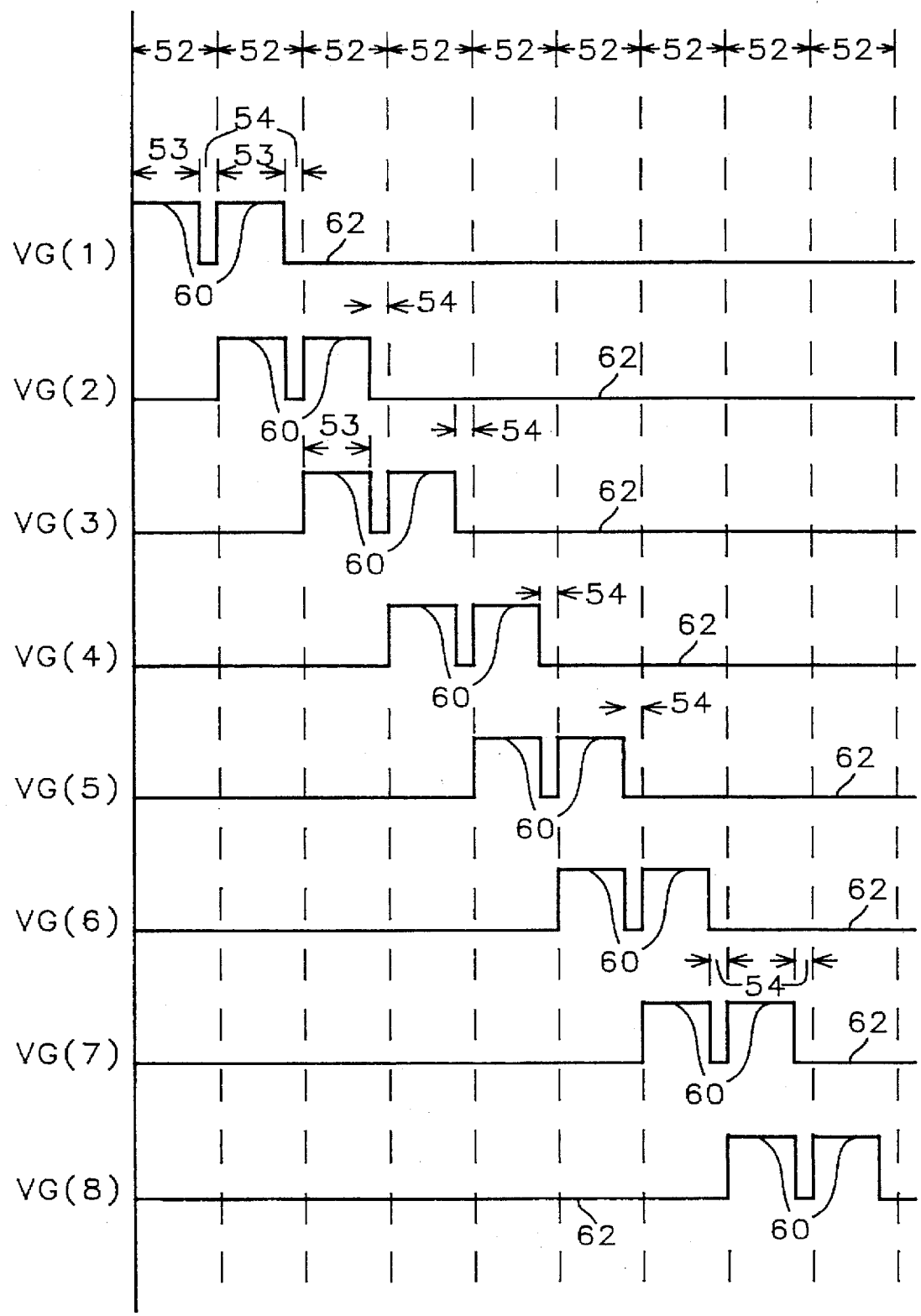
FIG. 7A shows the row select line pulse trains for one of the embodiments of this invention under progressive mode.
Figure 7B:
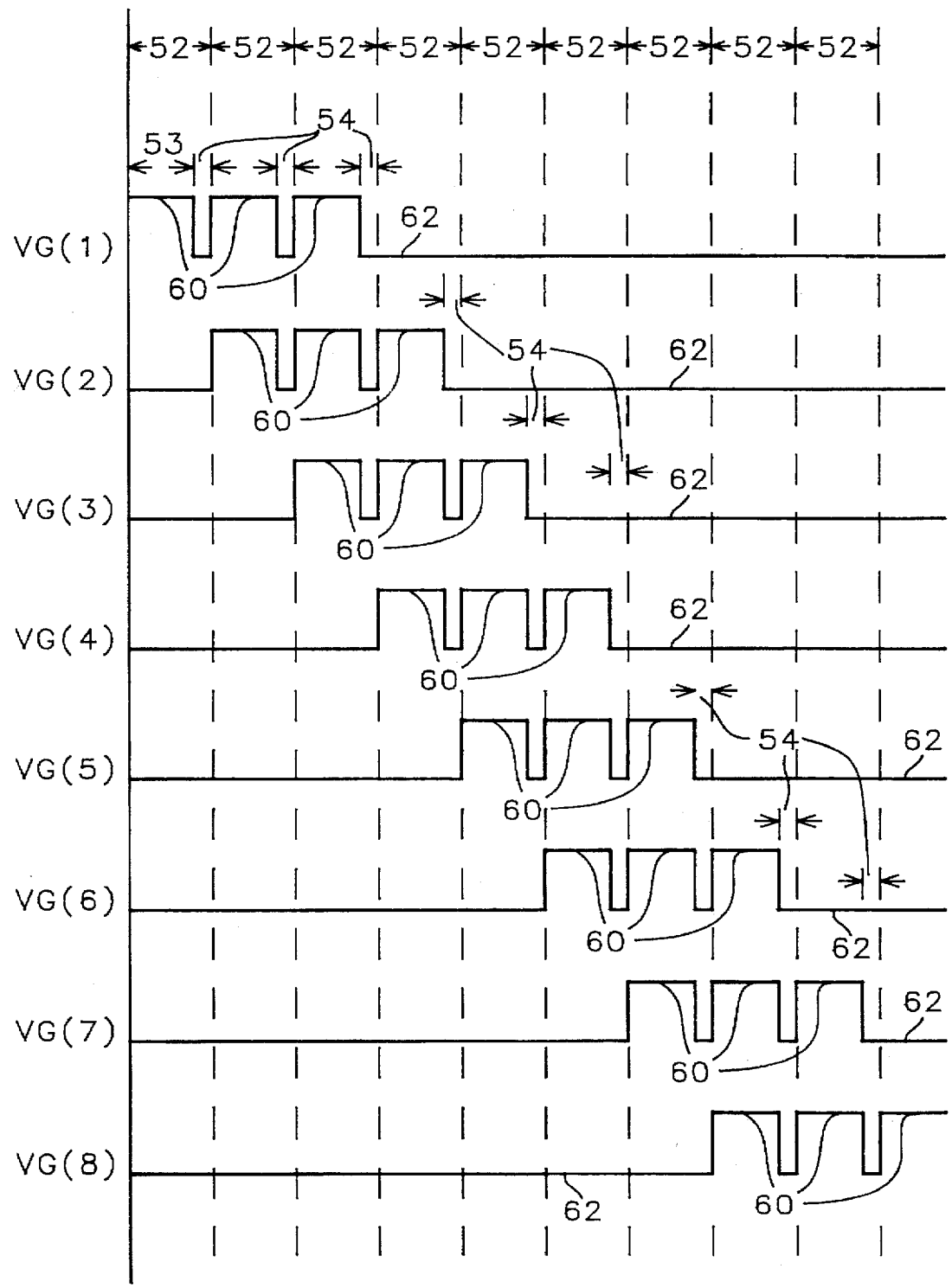
FIG. 7B shows the row select line pulse trains for another embodiment of this invention under progressive mode.

Refer now to FIG. 7A and FIG. 7B, there is shown another two embodiments of a method for driving the thin film transistor liquid crystal display under progressive mode (non-interlaced). In FIG. 7A two row select lines are selected at a time, except for the first sweep period in the first field, and in the second field, FIG. 7B, three row select lines are selected at a time except for the first and second sweep periods in the second field. As shown in FIG. 7A, the select mode voltage is applied sequentially to row select lines 1; 1 and 2; 2 and 3; 3 and 4; 4 and 5; 5 and 6; 6 and 7; . . . ; 476 and 478; 478 and 479; and 479 and 480. As shown in FIG. 7B, the select mode voltage is applied sequentially to row select lines 1; 1 and 2; 1, 2, and 3; 2, 3, and 4; 3, 4, and 5; 4, 5, and 6; 5, 6, and 7; 6, 7, and 8; . . . ; 475, 476, and 477; 476, 477, and 478; 477, 478, and 479; and 478, 479 and 480. In both embodiments when the select lines are not at the select mode voltage they are at the non select mode voltage. The embodiment of selecting two lines at a time is especially useful in a TFT LCD using two gate scan drivers as shown in FIG. 1.

While the invention has been particularly shown and described with reference to the preferred embodiments thereof, it will be understood by those skilled in the art that various changes in form and details may be made without departing from the spirit and scope of the invention.

What is claimed is:

1. A method of driving a display, comprising the steps of:
providing a display having a matrix array of cells formed in N rows by M columns, where N and M are positive integers, wherein each said cell comprises a pixel connected to a switching element, each said switching element having a row electrode and a column electrode, and each said cell is selected by applying a selecting voltage to said row electrode or not selected by applying a non selecting voltage to said row electrode;

connecting said row electrodes in each of said N rows of cells to a row select line thereby forming row select lines 1 through N;

connecting said column electrodes in each of said M columns of cells to a column data line thereby forming column data lines 1 through M;

providing N periodic voltages each said periodic voltage having a scanning period consisting of a first field followed by a second field, wherein each said scanning period consists of an integral number of sweep periods and each said sweep period consists of an integral number of block widths, wherein in each said sweep period each said periodic voltage is in select mode, having said non selecting voltage during the last said block width of said sweep period and said selecting voltage during the remainder of said sweep period, or in non select mode, having said non selecting voltage during the entire said sweep period;

providing means for selecting rows 1 through N of said cells by connecting said N periodic selecting voltages to said N row select lines so that during said first field, after the first said sweep period of said first field, said row select lines are selected in groups of two, three, or four and during said second field, after the first or second said sweep period of said second field, said row select lines are selected in groups of three or four, wherein the number of row select lines selected in said second field is equal to or one greater than the number of row select lines selected in said first field;

providing video signals 1 through M; and applying said video signals 1 through M to said column data lines 1 through M.

2. The method of claim 1 wherein said row select lines are selected in groups of three during said first field and groups of four during said second field after the first said sweep period of said second field.

3. The method of claim 2 wherein during sequential said sweep periods of said first field said periodic voltage in select mode is applied sequentially to row select lines 1; 1, 2, and 3; 3, 4, and 5; 5, 6, and 7; 7, 8, and 9; ... ; N–2, N–1, and N; during sequential said sweep periods of said second field said periodic voltage in select mode is applied sequentially to row select lines 1 and 2; 1, 2, 3, and 4; 3, 4, 5, and 6; 5, 6, 7, and 8; 7, 8, 9, and 10; ... ; N–3, N–2, N–1, and N; and during each said sweep period of said first field and said second field said periodic voltage in non select mode is applied to all remaining row select lines.

4. The method of claim 1 wherein said row select lines are selected in groups of two during said first field and groups of three during said second field after the second said sweep period of said second field.

5. The method of claim 4 wherein during sequential said sweep periods of said first field said periodic voltage in select mode is applied sequentially to row select lines 1; 1 and 2; 2 and 3; 3 and 4; 4 and 5; 5 and 6; 6 and 7; ... ; N–1 and N; during sequential said sweep periods of said second field said periodic voltage in select mode is applied sequentially to row select lines 1; 1 and 2; 1, 2, and 3; 2, 3, and 4; 3, 4, and 5; 4, 5, and 6; 5, 6, and 7; ... ; N–2, N–1 and N; and during each said sweep period of said first field and said second field said periodic voltage in non select mode is applied to all remaining row select lines.

6. The method of claim 1 wherein said display is a thin film transistor liquid crystal display.

7. The method of claim 1 wherein said switching element is a thin film transistor.

8. The method of claim 1 wherein said block width is 4.5 microseconds or greater.

9. The method of claim 1 wherein said sweep period is 31.78 microseconds or greater.

10. A display, comprising:

a display having a matrix array of cells formed in N rows by M columns, where N and M are positive integers, wherein each said cell comprises a pixel connected to a switching element, each said switching element having a row electrode and a column electrode, and each said cell is selected by applying a selecting voltage to said row electrode or not selected by applying a non selecting voltage to said row electrode;

row select lines 1 through N wherein each of said row select lines is connected to said row electrodes in one of said N rows of cells;

column data lines 1 through M wherein each of said column data lines is connected to said column electrodes in each of said M columns of cells;

N periodic voltages each said periodic voltage having a scanning period consisting of a first field followed by a second field, wherein each said scanning period consists of an integral number of sweep periods and each said sweep period consists of an integral number of block widths, wherein in each said sweep period each said periodic voltage is in select mode, having said non selecting voltage during the last said block width of said sweep period and said selecting voltage during the remainder of said sweep period, or in non select model having said non selecting voltage during the entire said seep period;

means for selecting rows 1 through N of said cells by connecting said N periodic selecting voltages to said N row select lines so that during said first field, after the first said sweep period of said first field, said row select lines are selected in groups of two, three, or four and during said second field, after the first or second said sweep period of said second field, said row select lines are selected in groups of three or four, wherein the number of row select lines selected in said second field is equal to or one greater than the number of row select lines selected in said first field;

video signals 1 through M; and means for applying said video signal 1 through M to said column data line 1 through M.

11. The display of claim 10 wherein said row select lines are selected in groups of three during said first field and groups of four during said second field after the first said sweep period of said second field.

12. The display of claim 10 wherein during sequential said sweep periods of said first field said periodic voltage in select mode is applied sequentially to row select lines 1; 1, 2, and 3; 3, 4, and 5; 5, 6, and 7; 7, 8, and 9; ... ; N–2, N–1, and N; during sequential said sweep periods of said second field said periodic voltage in select mode is applied sequentially to row select lines 1 and 2; 1, 2, 3, and 4; 3, 4, 5, and 6; 5, 6, 7, and 8; 7, 8, 9, and 10; ... ; N–3, N–2, N–1, and N; and during each said sweep period of said first field and said second field said periodic voltage in non select mode is applied to all remaining row select lines.

13. The display of claim 10 wherein said row select lines are selected in groups of two during said first field and groups of three during said second field after the second said sweep period of said second field.

14. The display of claim 10 wherein during sequential said sweep periods of said first field said periodic voltage in select mode is applied sequentially to row select lines 1; 1 and 2; 2 and 3; 3 and 4; 4 and 5; 5 and 6; 6 and 7; ... ; N–1 and N; during sequential said sweep periods of said second field said periodic voltage in select mode is applied sequentially to row select lines 1; 1 and 2; 1, 2, and 3; 2, 3, and 4; 3, 4, and 5; 4, 5, and 6; 5, 6, and 7; ... ; N–2, N–1 and N; and during each said sweep period of said first field and said second field said periodic voltage in non select mode is applied to all remaining row select lines.

15. The display of claim 10 wherein said display is a thin film transistor liquid crystal display.

16. The display of claim 10 wherein said switching element is a thin film transistor.

17. The display of claim 10 wherein said block width is 4.5 microseconds or greater.

18. The display of claim 10 wherein said sweep period is 31.78 microseconds or greater.

19. The method of claim 1 wherein said row select lines are selected in groups of three during said first field and groups of three during said second field after the first said sweep period of said second field.

20. The method of claim 19 wherein during sequential said sweep periods of said first field said periodic voltage in select mode is applied sequentially to row select lines 1; 1, 2, and 3; 3, 4, and 5; 5, 6, and 7; 7, 8, and 9; . . . ; N–3, N–2, and N–1; during sequential said sweep periods of said second field said periodic voltage in select mode is applied sequentially to row select lines 1 and 2; 2, 3, and 4; 4, 5, and 6; 6, 7, and 8; 8, 9, and 10; . . . ; N–2, N–1, and N; and during each said sweep period of said first field and said second field said periodic voltage in non select mode is applied to all remaining row select lines.

21. The method of claim 1 wherein said row select lines are selected in groups of four during said first field and groups of four during said second field after the first said sweep period of said second field.

22. The method of claim 21 wherein during sequential said sweep periods of said first field said periodic voltage in select mode is applied sequentially to row select lines 1 and 2; 1, 2, 3, and 4; 3, 4, 5, and 6; 5, 6, 7, and 8; 7, 8, 9, and 10; . . . ; N–4, N–3, N–2, and N–1; during sequential said sweep periods of said second field said periodic voltage in select mode is applied sequentially to row select lines 1, 2, and 3; 2, 3, 4, and 5; 4, 5, 6, and 7; 6, 7, 8, and 9; 8, 9, 10, and 11; . . . ; N–3, N–2, N–1, and N; and during each said sweep period of said first field and said second field periodic voltage in non select mode is applied to all remaining row select lines.

23. The display of claim 10 wherein said row select lines are selected in groups of three during said first field and groups of three during said second field after the first said sweep period of said second field.

24. The display of claim 23 wherein during sequential said sweep periods of said first field said periodic voltage in select mode is applied sequentially to row select lines 1; 1, 2, and 3; 3, 4, and 5; 5, 6, and 7; 7, 8, and 9; . . . ; N–3, N–2, and N–1; during sequential said sweep periods of said second field said periodic voltage in select mode is applied sequentially to row select lines 1 and 2; 2, 3, and 4; 4, 5, and 6; 6, 7, and 8; 8, 9, and 10; . . . ; N–2, N–1, and N; and during each said sweep period of said first field and said second field said periodic voltage in non select mode is applied to all remaining row select lines.

25. The display of claim 10 wherein said row select lines are selected in groups of four during said first field and groups of four during said second field after the first said sweep period of said second field.

26. The display of claim 25 wherein during sequential said sweep periods of said first field said periodic voltage in select mode is applied sequentially to row select lines 1 and 2; 1, 2, 3, and 4; 3, 4, 5, and 6; 5, 6, 7, and 8; 7, 8, 9, and 10; . . . ; N–4, N–3, N–2, and N–1; during sequential said sweep periods of said second field said periodic voltage in select mode is applied sequentially to row select lines 1, 2, and 3; 2, 3, 4, and 5; 4, 5, 6, and 7; 6, 7, 8, and 9; 8, 9, 10, and 11; . . . ; N–3, N–2, N–1, and N; and during each said sweep period of said first field and said second field periodic voltage in non select mode is applied to all remaining row select lines.

\* \* \* \* \*